United States Patent [19]
Nelson

[11] Patent Number: 5,758,401
[45] Date of Patent: *Jun. 2, 1998

[54] METHOD FOR MAKING A SHIELDED MAGNETIC STORAGE SYSTEM

[75] Inventor: Jordan Roy Nelson, Pennington, N.J.

[73] Assignee: Carbon & Polymer Research, Inc., Pennington, N.J.

[*] Notice: The term of this patent shall not extend beyond the expiration date of Pat. No. 5,651,171.

[21] Appl. No.: 770,011

[22] Filed: Dec. 19, 1996

Related U.S. Application Data

[63] Continuation of Ser. No. 450,890, May 26, 1995, Pat. No. 5,651,171, which is a continuation of Ser. No. 394,667, Feb. 22, 1995, abandoned.

[51] Int. Cl.$^6$ .......................................... B23P 11/00
[52] U.S. Cl. .......................................... 29/460; 29/428
[58] Field of Search .......................... 29/428, 458, 460; 206/709, 719, 720, 721, 308.3, 312, 313, 387.1, 387.15, 524.2, 524.3; 427/181, 217, 230

[56] References Cited

U.S. PATENT DOCUMENTS

| | | | |
|---|---|---|---|
| 4,119,195 | 10/1978 | Widener | 206/204 |
| 4,528,213 | 7/1985 | Nelson et al. | 427/105 |
| 4,528,222 | 7/1985 | Rzepecki et al. | 206/719 X |
| 4,684,020 | 8/1987 | Ohlbach | 206/721 |
| 4,706,438 | 11/1987 | Ohlbach | 206/721 X |
| 4,792,042 | 12/1988 | Koehn et al. | 206/328 |
| 4,796,755 | 1/1989 | Ardenti | 206/444 |
| 4,848,566 | 7/1989 | Havens et al. | 206/328 |
| 4,971,196 | 11/1990 | Kitamura et al. | 206/720 X |
| 5,107,989 | 4/1992 | Becker | 206/721 X |
| 5,270,901 | 12/1993 | Nowak et al. | 206/719 X |
| 5,415,288 | 5/1995 | Ozaki | 206/387.1 |

FOREIGN PATENT DOCUMENTS

| | | | |
|---|---|---|---|
| 315935 | 5/1989 | European Pat. Off. | 206/387.1 |
| 2586498 | 2/1987 | France | 206/387.1 |
| 2608423 | 9/1997 | Germany | 206/387.1 |
| 58-102373 | 6/1983 | Japan | 206/387.1 |
| 1-167088 | 6/1989 | Japan | 206/308.3 |
| 620431 | 1/1994 | Japan | 206/387.1 |
| 2104774 | 3/1983 | United Kingdom | 206/387.1 |

OTHER PUBLICATIONS

LNP Corporation Handout, Thermoplastic Composites For Electrostatic Dissipation And EMI Attenuation, by Jack E. Travis, 39th annual Conf. of SPI–RCPI, Jan. 19, 1984 (cover page, abstract, Table 1).

Cambridge Dictionary of Science and Technology, "Faraday Cage" definition.

Carolina Solvents, Inc., *Silver Coated Magnetic Ceramic Microballoons*, 9 pages (undated).

Jeff Rothenberg, *Ensuring the Longevity of Digital Documents*, Scientific American: Jan. 1995, pp. 42–47.

Glenn Calderone, *How to Buy Videotape*, Videomaker: Jan. 1995, pp. 60–67.

Frank Thompson, *Life With Video: Time Machines*, Film Comment: Nov.–Dec. 1991, p. 72.

(List continued on next page.)

*Primary Examiner*—Tom Hughes
*Attorney, Agent, or Firm*—Darby & Darby

[57] ABSTRACT

The invention provides an archival storage system for shielding magnetic media from a full spectrum of electromagnetic fields, static electricity, and humidity. Full spectrum EMF shielding may be achieved by providing the storage container with a continuous conductive layer along or on an interior region of the storage container. Also, shielding against intense, low frequency magnetic fields may be provided by a ferrous metal sheet, separated from the stored magnetic media by an insulator, which has been placed a plane generally perpendicular to the axis of rotation of the reels of a videotape or floppy disk. Further, a moisture seal may be provided to prevent moisture from reaching the stored magnetic media and thereby enhance the longevity of the stored magnetic media, and a desiccant may be provided to maintain or stabilize a low humidity environment within the storage case.

18 Claims, 2 Drawing Sheets

OTHER PUBLICATIONS

Gregg Keizer, *Crumbling Infostructures*, Omni: Mar. 1992, pp. 56–61.

Robert Zimmerman, *Shelf Lives and Videotapes*, Fortune: Oct. 18, 1993, p. 99.

Wayne M. Barrett, *Technology*, USA Today: Apr. 1993, p. 11.

Frank Beacham, *Videotape's Wonder Years*, Video: Oct. 1991, 5 pages.

METHOD FOR MAKING A SHIELDED MAGNETIC STORAGE SYSTEM

This is a continuation, of application Ser. No.08/450,890, filed May 26 1995 now U.S. Pat. No. 5,651,191 which is a continuation of the parent application Ser. No. 08/394,667, filed Feb. 22 1995, now abandoned.

FIELD OF THE INVENTION

The present invention relates to magnetic media storage systems, and more particularly to a storage system that shields magnetic storage devices from environmental factors which degrade over time the quality and extent of information stored on them.

BACKGROUND OF THE INVENTION

Today, large quantities of information are stored on magnetic storage devices. Exemplary magnetic storage devices include magnetic tapes for storing video and audio information, and floppy and hard disks for storing computer data. A concern to those who store important information on such magnetic media is that the information will erase over time. This concern is warranted, as magnetic media are known to degrade over time. See Time Machine: Life With Video, FILM COMMENT, Nov.–Dec. 1991, p. 72. The degradation may result in reduced video or audio quality, and in the case of computer software, may result in an inoperable program or a non-retrievable data file.

Each of these magnetic media is typically provided with a storage case at the time of purchase. The storage case may be a coated cardboard container or a container made of plastic. Such storage cases provide only a limited degree of protection to the magnetic media contained therein. With respect to videotapes, for example, these conventional containers do little more than keep dirt, dust, and smoke away from the videotape. Accordingly, those concerned with information loss have been forced to make copies of their data as a solution to the risk of relying on a single magnetic storage device. Each copy generated will exhibit a reduction in quality because a perfect copy cannot practically be made, even if the information is digitally encoded, in view of local imperfections in the magnetic media base or coating materials. In the case of analog information, for example, a video of a wedding, any loss of signal is a permanent loss of the recorded information. As for digital information, error correction routines and redundancy are solutions that can minimize the effects of degradation; however, neither solution is curative of the problem of degradation.

Manufacturers of video tapes have warned of the detrimental impact of magnetic fields on the long term storage of videotapes, yet they have not offered any solutions to the problem of archival videotape storage. Rather, these manufacturers have merely advised consumers to avoid storing video tapes near field generating devices such as stereo speakers and television sets. See R. Zimmerman, "Shelf Lives And Videotape," FORTUNE, p. 99, Oct. 18, 1993. The reason for this advice is that conventional storage containers do not shield the video tapes from electric and magnetic fields (EMF) or electrostatic discharges (ESD). Conventional storage containers for both videotapes and computer disks are electrically insulating and therefore provide no mechanism to divert EMF The Sony Corporation is one of few videotape manufactures that has publicly commented on the longevity of recordings on videotape. Sony's testing has indicated that cool, low humidity conditions are required for long term storage of video tapes (approximately fifteen years) without significant degradation. See F. Beachan, "Videotape's Wonder Years," VIDEO, pp. 50–51 and 95–97, October 1991. Yet, despite this testing, no known video storage containers exist which actively reduce humidity and otherwise address the problems of archival storage of video tapes (and computer disks). Known storage containers, in particular, the plastic "clam-shell" case, may protect a tape stored therein from external moisture, but still do not actively protect the tape from humidity within the container or remove humidity from the tape itself.

Electromagnetic interference (EMI) is the combined interference effect of magnetic and electric fields. There have been advances in shielding EMI sources such-as television sets, computer monitors, stereo speakers, and the like. However, what is needed in the art and has heretofore not been provided is a storage system for magnetic media that is adapted for storing such media for archival purposes, that is, for prolonged periods of time, while shielding the magnetic media from the degrading effects of EMI-and moisture. The present invention satisfies these and other needs in a low cost, simple to manufacture system.

SUMMARY OF THE INVENTION

The present invention provides an archival storage system for shielding magnetic media from a full spectrum of electromagnetic fields, static electricity, and humidity.

According to one aspect of the invention, full spectrum EMF shielding is provided as a first level of protection to shield stored magnetic media. Full spectrum EMF shielding may be achieved by providing the storage container with a continuous conductive layer along or on an interior region of the storage container. This conductive layer enwraps the stored magnetic media to shield it from ESD, as well as electromagnetic fields in the kilohertz, megahertz, and gigahertz ranges.

According to another aspect of the invention, shielding may be provided against intense, low frequency magnetic fields as a second level of protection for stored magnetic media. A ferrous metal sheet is preferably separated from the stored magnetic media by an insulator, such as the housing of a conventional storage container, and placed in a plane generally perpendicular to the axis of rotation of the reels of the videotape or the floppy disk. In a preferred embodiment for videocassette storage, a metal sheet may be inserted into an external pocket of a conventional clam-shell videocassette case, along with any cover art material.

According to a further aspect of the invention, a seal may be provided to prevent moisture from reaching the stored magnetic media and thereby enhance the longevity of the stored magnetic media. Further, a drying agent or desiccant may be provided to maintain or stabilize a low humidity environment within the storage case.

These and other aspects of the invention are perhaps better appreciated with reference to the detailed description of the preferred embodiments and drawings in which:

FIG. 1 illustrates a storage case modified in accordance with the present invention in an open condition as may be used with a video cassette or with one or more computer floppy disks; and FIG. 2 illustrates the storage case of FIG. 1 in a closed condition.

DETAILED DESCRIPTION OF THE PREFERRED EMBODIMENTS

Figure 1:
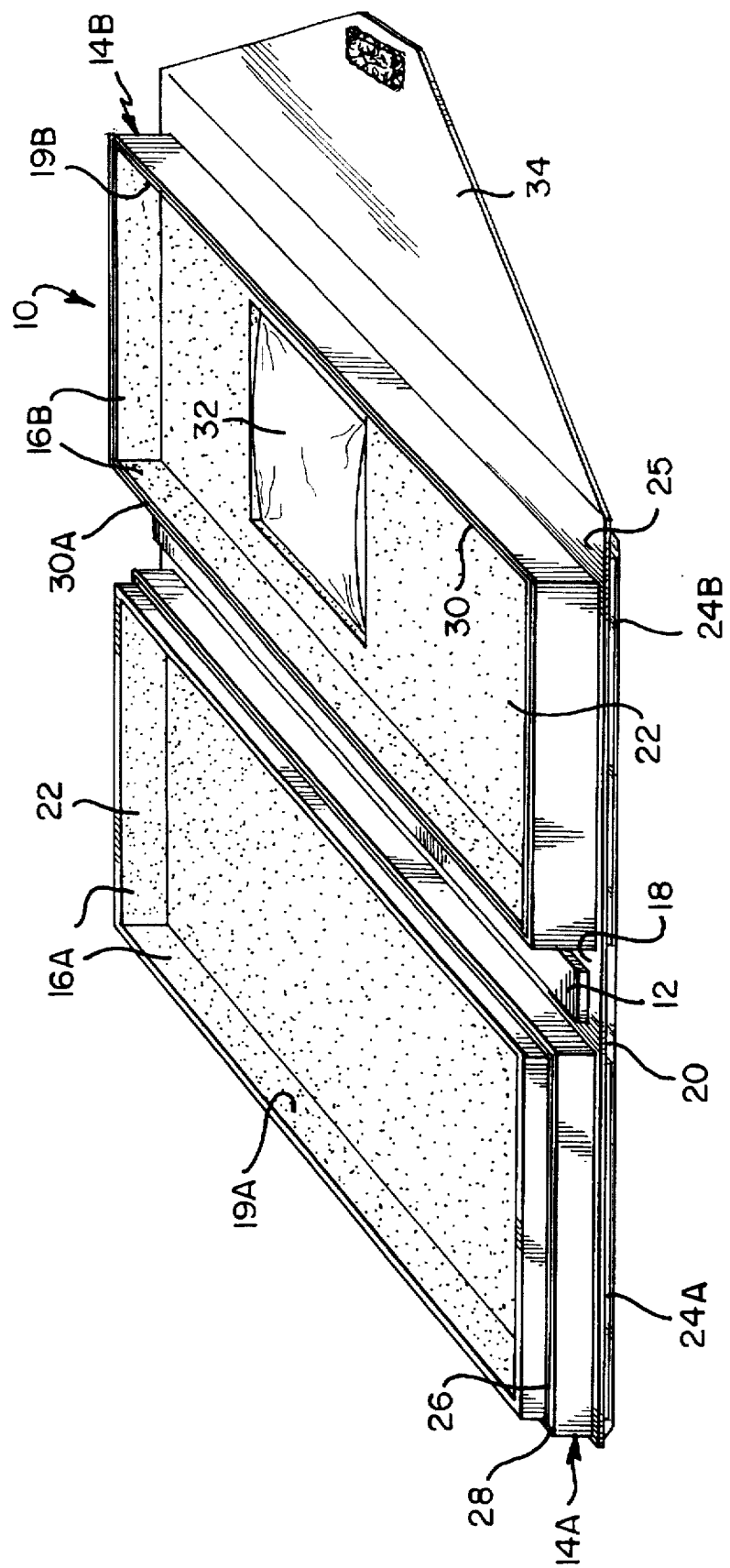
Figure 2:
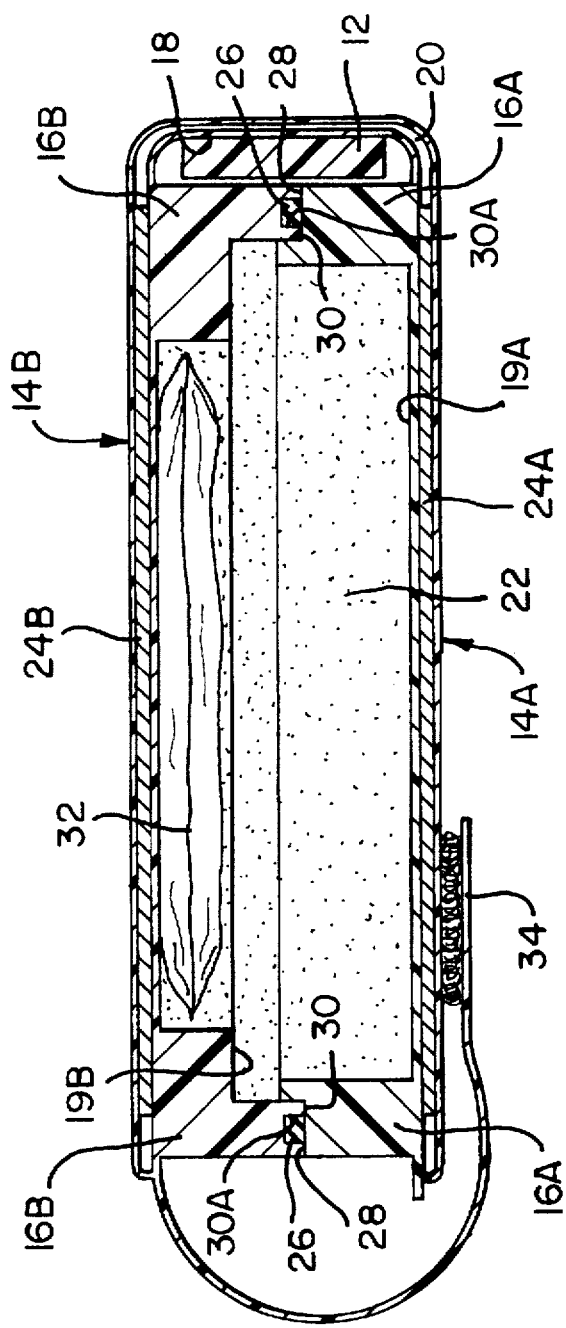

By way of overview and introduction, there is seen in FIG. 1 a storage container 10 modified in accordance with the present invention to shield magnetic media from a full spectrum of electromagnetic fields, static electricity, and humidity. The storage container 10 is generally illustrated as a clam-shell type case sized to accommodate a standard VHS videocassette tape, although the container 10 can be sized to accommodate several videotapes (in VHS, Beta, ¾ inch, 8 mm, or other formats) or one or more computer disks. This type of storage case is electrically insulating, and is typically made from polyvinylchloride (PVC) or polypropylene. Clam-shell type storage cases have a spine 12 which hingeably links together two halves of a video cassette storage compartment 14A,B. Each half of the storage compartment 14A,B respectively has sidewalls 16A,B that extend normal to a supporting surface 18 on either side of the spine 12 to define two cavities 19A,B. The cavities 19A,B are open on one side when the storage container 10 is open, as shown in FIG. 1, yet form a continuous, closed box when the storage container 10 is hingeably closed (FIG. 2). Conventionally, one of the sidewalls 16A,B is configured to overlap the other, or form a loosely interfering fit with respect thereto, so that the storage container 10 may be hingeably closed around a video cassette or other magnetic media for storing the magnetic media. In this manner, the storage container 10 selectively provides access to magnetic media contained therein through a resealable closure means. In addition, an external pocket may be provided for housing cover art material indicating, for example, the title of a film, content of a tape, or the name of a computer software application.

In the embodiment of FIG. 1, four distinct forms of protection are provided against environmental factors which degrade over time the quality and extent of information stored on a magnetic medium. For example, the signal to noise ratio of recorded information to white noise (that is, random information).

First, a continuous layer 22 may be provided as a first shielding means within each cavity 19A,B. This first shielding means shields the interior region of the storage container 10 from a full spectrum of electromagnetic fields. Preferably, this first shielding means in close proximity to the stored magnetic media when the storage container 10 is closed, that is, when the magnetic media is being stored for subsequent use. Hence, this first shielding means provides an effective shield against a full spectrum of electric and magnetic fields by providing a continuous conductive layer that enwraps the stored magnetic media and electrically shorts the two cavities 19A,B together. The cavities are electronically shorted together by closing the storage container 10 and thereby bringing the layer 22 on each cavity 19A,B into contact with each other and to an equipotential state, as shown in FIG. 2.

The conductive layer 22 may be provided in many forms. A conductive layer may be painted, sputtered, electroformed, deposited, plated, or otherwise coated on the interior-surface of a conventional plastic storage container, at least within the two cavities 19A,B. This layer may be of various metals, conductive carbons, etc. A suitable paint for the conductive layer 22 may be a urethane paint having silver coated ceramic beads (SCCBs) interspersed therein. When used in the inventive storage container 10, the SCCBs serve as a vehicle for protecting the stored magnetic media from a full spectrum electromagnetic fields as well as electrostatic discharges by absorbing these fields and discharges. A suitable urethane based paint having interspersed SCCBs is available from Spectro Dynamic Systems (formerly Carolina Solvents, Inc.) of Hickory, N.C. Of course, paints having different metals interspersed therein, for example, copper or nickel, may work with equal advantage in the inventive storage container 10. The conductive layer 22 may also be provided as a woven metal mat such as the 6610 Thermoformable EMI-Shielding Material available from 3M Electrical Specialties, Austin, Tex. a division of the 3M Corporation. Any combination of the foregoing conductive layers 22 would achieve shielding of magnetic media in accordance with the present invention.

Second, a pair of ferrous metal sheets 24A,B may be provided on an exterior portion of the storage container 10 as a second shielding means for shielding the interior region of the storage container from intense, low frequency electromagnetic fields. The term "intense " refers to magnetic fields that are of a magnitude sufficient to saturate the magnetic shielding ability of the continuous coating 22, if present. The ferrous metal sheets should be separated from the stored magnetic media by an insulator, such as a layer 25. The layer 25 may be the housing of a conventional clam-shell type container and the support surface 18 may be a surface of the layer 25. Of course the ferrous metal sheets 24A,B may comprise a single sheet of metal provided about the exterior of the storage container 10, extending either across one broad surface substantially opposite one of halves 14A,B, or extending across both of halves 14A,B and perhaps the spine 12 as well. The metal sheets 24 A,B form a shield external to the cavities 19A,B yet connected to the storage container 10.

This second shielding means may be formed by incorporating into a conventional plastic container metals, carbons, or conductive coatings as an exterior layer, or by providing sheets of ferrous material in the exterior pouch 20, the pouch 20 being sealed on three sides and open on one side to receive cover art material and the like as well as the second shielding means in accordance with the invention. For example, a pair of 0.0538 inch (eighteen gauge) sheets of cold rolled steel 24A,B may be inserted into the pouch 20, as described below in the comparative example. Thicker ferrous metal sheets (having lower gauge values) provide superior protection than do thinner ferrous metal sheets (having higher gauge values) with increasing low frequency electromagnetic field strength; however, the lower gauge sheets are less practical because they are more expensive and add considerably to the weight of the storage container 10. Thus, in view of the foregoing practical considerations, a preferred range is twenty-eight to eighteen gauge, with the higher range of gauges being more preferred for consumer applications, and the lower range of gauges being more preferred for professional applications. Overall, twenty-six to twenty-four gauge is presently the most preferred range.

Third, a gasket 26 may be provided on one of the sidewalls 16A,B, preferably on a support surface 28 thereof, as a third means for protecting stored magnetic media. The gasket 26 isolates the interior region of the storage container 10 from any external humidity when in a closed condition (see FIG. 2). In FIG. 1, the gasket 26 is shown as a layer mounted on the support surface 28 of the sidewall 16A. A surface 30 of the sidewall 16B contacts the gasket 26 when the two halves 14A,B are brought into contact, that is, when the storage container 10 is closed. The gasket layer 26 may be sprayed onto the storage container 10, or attached by an adhesive, as understood by those skilled in the art, and may comprise a silicon or foam layer. Alternatively or in addition, the gasket layer 26 may comprise a grease layer, advantageously housed in a slot 30A in the sidewall 16B to seal the two halves 14A,B when the storage container 10 is closed. The sidewall 16A may have a complementary tongue that is received in the slot 30A to improve the isolation of the interior region from any external humidity.

Fourth, a desiccant may be provided, for example, in a pouch 32, to actively remove any moisture that might otherwise be present within the storage container 10. One suitable desiccant known as Drierite ™ is available from W. A. Hammond Co., of Zenia, Ohio. Typical chemicals used as drying agents include calcium sulfate. The storage container 10 may further include a humidity indicator that indicates, for example, the relative humidity in a range of ten to sixty percent on a color scale, for example, a change from light blue to purple, to indicate the moisture content within the container 10.

In addition to the foregoing protections against degradation over time of the quality and extent of information stored on a magnetic medium, mechanical protection may be provided to assist in ensuring that the storage container 10 remains closed, as by a mechanical locking means. In FIG. 1, this mechanical protection is provided in the form of a VELCRO ™ closure. VELCRO ™ closures are known. They consist of interlocking and complementary hook and loop structures. In the embodiment of FIG. 1, a tab 34 having one of the aforementioned hook and loop structures thereon extends from one half 14B of the storage container 10 so that it may be secured to a complementary VELCRO ™ structure disposed on the surface containing the external pocket 20, opposite the half 14B. Preferably, the VELCRO ™ closure is provided on a triangular shaped tab 34 such that the VELCRO ™ closure is centrally positioned along one margin of the storage container 10. Alternatively, the VELCRO ™ closure may be positioned at the top and bottom edge portions of the storage container 10, on the side opposite the spine 12.

The high frequency EMF performance of the electromagnetic shield coating has previously been characterized in a data sheet from Carolina Solvents; Inc. of independent test data prepared by Technical Systems Associates, Inc. for a commercially available grade of material, the disclosure of this data sheet is incorporated by reference as if set forth in its entirety herein. In particular, the SCCBs provide forty to sixty decibels of protection over a full spectrum of EMF. The same performance characteristics can be expected when used with the inventive storage container 10. "Real world " examples of high frequency sources of EMF include the erasing heads of tape decks, cellular and portable telephones, television sets, computers, and the like.

To test the low frequency EMF performance of the inventive storage system, an accelerated degradation test was conducted. The accelerated degradation test was adapted to simulate the effects of long term exposure to high strength, low frequency EMF by exposing magnetic media stored in a conventional storage container to a large field for a short period of time. In this manner, the point at which the magnetic media has degraded a predetermined amount can be determined. A bulk tape eraser was used as a source of intense, low frequency EMF. Typical "real world " sources of low frequency EMF include audio speakers, household wiring, the earth, power lines, electric stoves, motors, and the like. Once a predetermined amount of degradation was established in a conventional storage container, the relative performance of the inventive storage system was assessed by comparing the relative degradation of magnetic media contained in the inventive storage container after identical exposure.

TESTING METHODOLOGY

In each of these tests, identical tapes and storage containers were used. Further, the tape in each of the experiments was rolled up on one reel, and the exposures to the tape eraser were identical in time, intensity, and location. The tape eraser was placed in contact with the storage container so that the distance from the tape remained constant throughout the experiments. The tape eraser was slowly rotated over a broad surface of the storage container to ensure that the entire tape was exposed to the output field of the tape eraser. A conventional tape is 4.125"×7.375"×1", and the "broad" side of the storage container is somewhat larger than the 4.125"×7.375"cross-section of the tape. Hence, the only variable in these tests was the presence or absence of the shielding layers according to the invention.

COMPARATIVE EXAMPLE

According to the above methodology, the ability of the inventive storage container 10 to withstand low frequency EMF was examined. Two professional grade videotapes (3M Corporation's T30 VHS Professional Videocassette) on which identical video and audio material were recorded and used in this example.

First, the videotape was placed within a conventional storage container and was exposed to a high-power tape eraser (Radio Shack catalog number 44-233A, a division of the Tandy Corporation, Ft. Worth, Tex.) for a five second interval. The exposure was made in a plane generally perpendicular to the axis of rotation of the reels of the videotape. As a result of this exposure, the signal to noise ratio was severely reduced: only ten percent of the originally recorded signal was watchable, as measured using a double-handed stopwatch on the basis of the number of watchable segments within the overall measurement interval (five seconds). The recorded material after the exposure cycled in appearance as the tape was played from a snow pattern, to the same having audio, then having partial video, and then full video, and back to the snow pattern.

Next, the experiment was repeated as above using the second videotape and a storage container provided with a pair of eighteen gauge cold rolled sheets of steel 24A,B. The sheets 24A,B measured 4.875×8.750 inches, in their broad dimension, and are available, for example, from Trenton Sheet Metal, Inc. Such sheets fit readily into the external pocket 20. The sheets of steel were inserted into the external pocket 20 on each of the broad sides of the storage container 10 as a shield. After a five second exposure, the tape contained within the storage container 10 having the ferrous metal sheets 24A,B exhibiteded no signs of loss of either video or audio material. In shot, the tape stored in the inventive storage container remained perfect.

The test was repeated to confirm the precision of the experiment; the repeated test provided substantially identical results.

The term "floppy disks" as used in this specification refers to 5.25" and 3.5" size disks, and other sizes which may be available or become available in the future. Also, the term "humidity" refers to the moisture content of the ambient in which the magnetic media is stored. The term "full spectrum" includes electric and magnetic fields from low to high frequencies, typically within the range of the aforementioned "real world" examples, but also beyond this range.

By necessity, conventional storage containers are larger than the tape or computer disk to be stored. This is due to the finite thickness of the sidewalls 16A,B and the layer 25 which, as previously noted, may be the housing of a conventional clam-shell type container. For example, the dimensions of a clam shell container according to the invention may be 5.250"×9.000"×1.625" which exceeds the dimensions of a conventional VHS format videotape in each dimension. This permits the provision of cold rolled sheets 24A,B that have a broad dimension that is larger than the broad dimension of the videotape or computer disk being stored which increases the capability of the sheets 24A,B to shield the stored magnetic media, and permits the provision of a desiccant pouch.

From the foregoing description, it will be clear that the present invention may be embodied in other specific forms without departing from the spirit or essential characteristics thereof. Thus, while the foregoing description has been directed primarily to the storage of video cassettes, which is the presently preferred mode, the invention is not so limited. The invention can be used with equal advantage for storing other magnetic media, for example, computer disks. In this alternative mode, the storage container may be configured substantially as shown in FIG. 1. The dimensions of the storage container are not critical to the invention. All that is required is that the container be able to enwrap the media to be stored with a conductive layer. Further, while video cassettes are conventionally stored individually, the same is not true for computer disks. Hence, a single storage container according to the present invention may store a plurality of computer disks, provided that the interior region of the storage container is suitably adapted, for example, to hold ten floppy disks. The storage container as shown in FIG. 1 could readily accommodate a single 1" deep video tape, or a plurality of floppy disks. Of course, the container may have dimensions suitable for accommodating the particular form factor of the floppy disks to be stored. The presently disclosed embodiment is therefore to be considered in all respects as illustrative and not restrictive, the scope of the invention being indicated by the appended claims, and not limited to the foregoing description.

I claim:

1. A method for making a magnetic media storage container, comprising the steps of:

providing a storage container having two broad surfaces separated by sidewalls, the two broad surfaces and sidewalls defining an interior region and an exterior region;

forming a pouch on the exterior region of said container which is sealed on three sides; and inserting at least one ferrous plate in the pouch so that the at least one ferrous plate is disposed along one of the two broad surfaces.

2. The method as in claim 1, including the additional step of applying a conductive layer to the interior region of the storage container, the conductive layer being continuous within the interior region when the storage container is in a closed condition and comprising an urethane paint including interspersed metal coated ceramic beads.

3. The method as in claim 2, including the additional step of placing a desiccant adjacent the conductive layer.

4. The method as in claim 3, including the additional step of providing a humidity indicator to indicate the moisture content within the container.

5. The method as in claim 1, including the additional step of applying a conductive layer to the interior region of the storage container, the conductive layer being continuous within the interior region when the storage container is in a closed condition and comprising a woven metal mat.

6. the method as in claim 5, including the additional step of placing a desiccant adjacent the conductive layer.

7. The method as in claim 6, including the additional step of providing a humidity indicator to indicate the moisture content within the container.

8. The method as in claim 1, wherein the storage container is made of a material selected from the group consisting of polyvinylchloride and polypropylene.

9. The method as in claim 1, including the additional step of attaching to the sidewalls a gasket made of a material selected from the group consisting of silicon and foam.

10. The method as in claim 1, wherein the sidewalls are connected to one of the two broad surfaces, including the additional steps of:

defining a slot in the sidewalls of the broad surface to which the sidewalls are connected; and defining a tongue in the other of the two broad surfaces;

providing a gasket in the slot, whereby the tongue engages the gasket when storage container is in the closed condition.

11. The method as in claim 10, wherein the gasket in the slot is made of a material selected from the group consisting of a grease layer, a foam layer, and a silicon layer.

12. The method as in claim 2, wherein the step of applying a conductive layer is selected from the group consisting of painting, sputtering, electroforming, depositing, and plating.

13. The method as in claim 5, wherein the step of applying a conductive layer is selected from the group consisting of painting, sputtering, electroforming, depositing, and plating.

14. The method as in claim 1, wherein the at least one ferrous plate has a thickness between twenty-eight and eighteen gauge.

15. The method as in claim 1, wherein the at least one ferrous plate is made of steel.

16. The method as in claim 3, wherein the interior region shaped to receive a videotape in addition to the conductive layer and the desiccant.

17. The method as in claim 6, wherein the interior region shaped to receive a videotape in addition to the conductive layer and the desiccant.

18. The method as in claim 1, including the additional step of affixing complementary velcro tabs on each of the two broad surfaces.

* * * * *